US009298272B2

(12) United States Patent
Ou

(10) Patent No.: US 9,298,272 B2
(45) Date of Patent: Mar. 29, 2016

(54) KEYBOARD FOR SUPPORTING ELECTRONIC DEVICE

(71) Applicant: ScienBiziP Consulting (Shen Zhen) Co., Ltd., Shenzhen (CN)

(72) Inventor: Guang-Feng Ou, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days.

(21) Appl. No.: 14/518,830

(22) Filed: Oct. 20, 2014

(65) Prior Publication Data

US 2015/0169078 A1   Jun. 18, 2015

(30) Foreign Application Priority Data

Dec. 12, 2013   (CN) .......................... 2013 1 0672596

(51) Int. Cl.
*G06F 1/16*   (2006.01)
*G06F 3/02*   (2006.01)

(52) U.S. Cl.
CPC ............ *G06F 3/0219* (2013.01); *G06F 1/1626* (2013.01); *G06F 1/1632* (2013.01); *G06F 3/0202* (2013.01)

(58) Field of Classification Search
CPC .............................. G06F 1/1669; G06F 3/0219
USPC ..................................................... 361/679.17
See application file for complete search history.

(56) References Cited

U.S. PATENT DOCUMENTS

| 8,199,494 B2 * | 6/2012 | Nguyen | ................ H05K 7/1428 312/223.1 |
| 2013/0170126 A1 * | 7/2013 | Lee | ........................ G06F 1/1654 361/679.17 |
| 2015/0160700 A1 * | 6/2015 | Yang | ...................... G06F 1/1669 361/679.17 |
| 2015/0198980 A1 * | 7/2015 | Aoki | ......................... G06F 1/16 361/679.17 |

* cited by examiner

*Primary Examiner* — Anthony Q Edwards
(74) *Attorney, Agent, or Firm* — Novak Druce Connolly Bove + Quigg LLP

(57) ABSTRACT

A keyboard for supporting an electronic device includes a keyboard body and an adjusting device. The keyboard body defines a receiving portion for receiving an electronic device, a first adjusting hole, and a second adjusting hole. The adjusting device includes a stopping plate received in the receiving portion, a first adjusting pole, and a second adjusting pole. The first adjusting pole extends out of the first adjusting hole to abut against the stopping plate. The second adjusting pole extends out of the second adjusting hole to abut against the stopping plate. An angle is defined between the first adjusting pole and the electronic device and the angle is adjustable based on the first adjusting pole and the second adjusting pole being mounted to a plurality of positions.

20 Claims, 5 Drawing Sheets

KEYBOARD FOR SUPPORTING ELECTRONIC DEVICE

CROSS-REFERENCE TO RELATED APPLICATIONS

This application claims priority to Chinese Patent Application No. 201310672596.5 Dec. 12, 2013, the contents of which are incorporated by reference herein.

FIELD

The subject matter herein generally relates to a keyboard for supporting an electronic device.

BACKGROUND

A keyboard can be used to support an electronic device.

BRIEF DESCRIPTION OF THE DRAWINGS

Implementations of the present technology will now be described, by way of example only, with reference to the attached figures.

DETAILED DESCRIPTION

Figure 1:
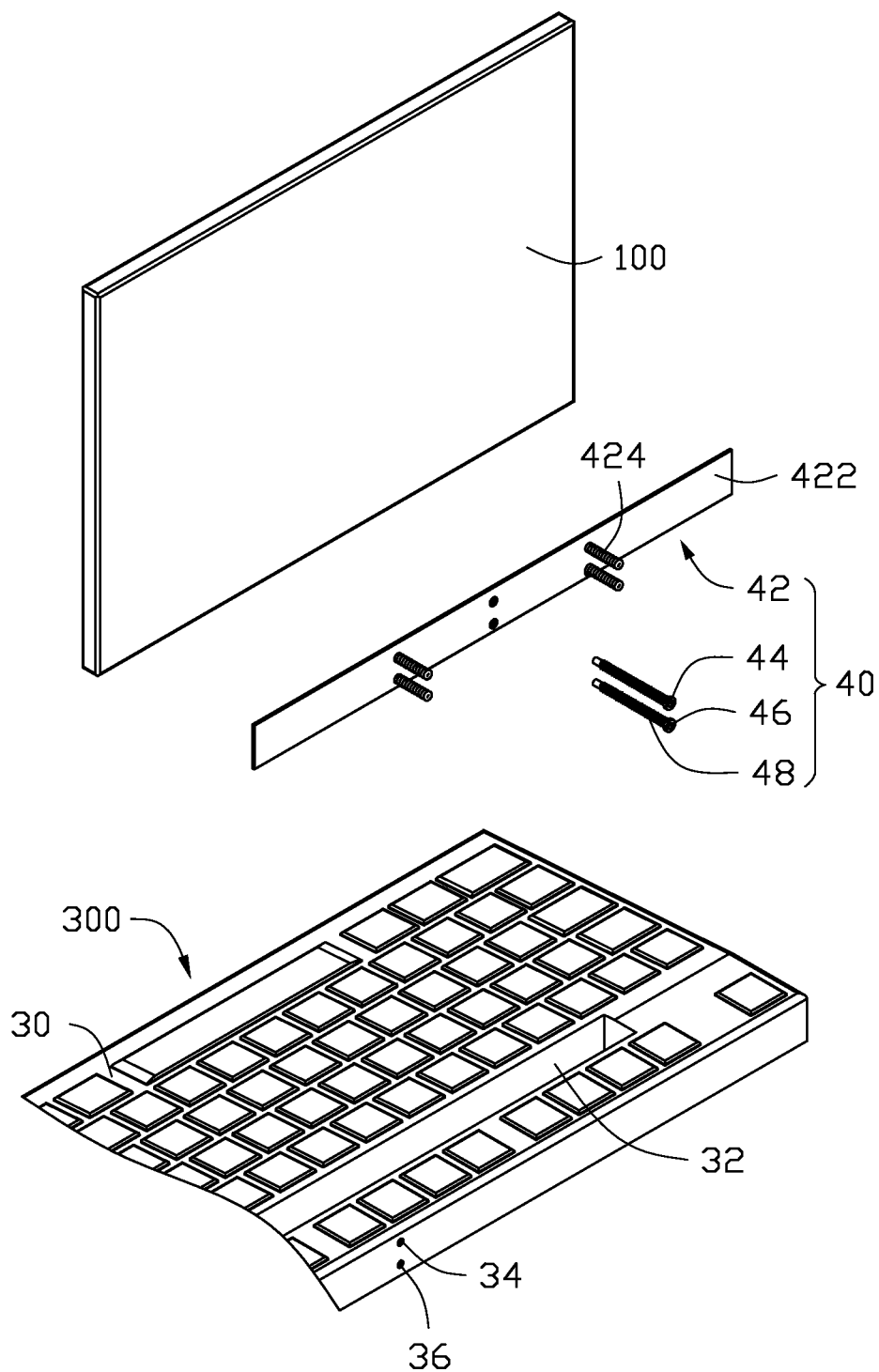
FIG. 1 is an exploded, isometric view of an embodiment of a keyboard for supporting an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "comprising, but not necessarily limited to"; it specifically indicates open-ended inclusion or membership in the so-described combination, group, series, and the like.

The present disclosure is described in relation to a keyboard for supporting an electronic device.

FIG. 1 illustrates an embodiment of a keyboard 300 for supporting an electronic device 100. The keyboard 300 comprises a keyboard body 30 and an adjusting device 40. In one embodiment, each the electronic device 100 and the keyboard 300 are substantially rectangular.

The keyboard body 30 defines a receiving portion 32, a first adjusting hole 34, and a second adjusting hole 36. Each the first adjusting hole 34 and the second adjusting hole 36 are coupled to the receiving portion 32. Each the first adjusting hole 34 and the second adjusting hole 36 defines an inner screw thread (not labeled).

The adjusting device 40 comprises a stopping plate 42, a first adjusting pole 44, and a second adjusting pole 46. The stopping plate 42 comprises a plate body 422 and a plurality of elastic members 424. The elastic members 424 are secured on the plate body 422 and are substantially perpendicular to the plate body 422. Each the first adjusting pole 44 and the second adjusting pole 46 define an outer screw thread 48 (shown in FIG. 4). In one embodiment, the stopping plate 42 is substantially rectangular and each elastic member 424 is a spring.

Figure 2:
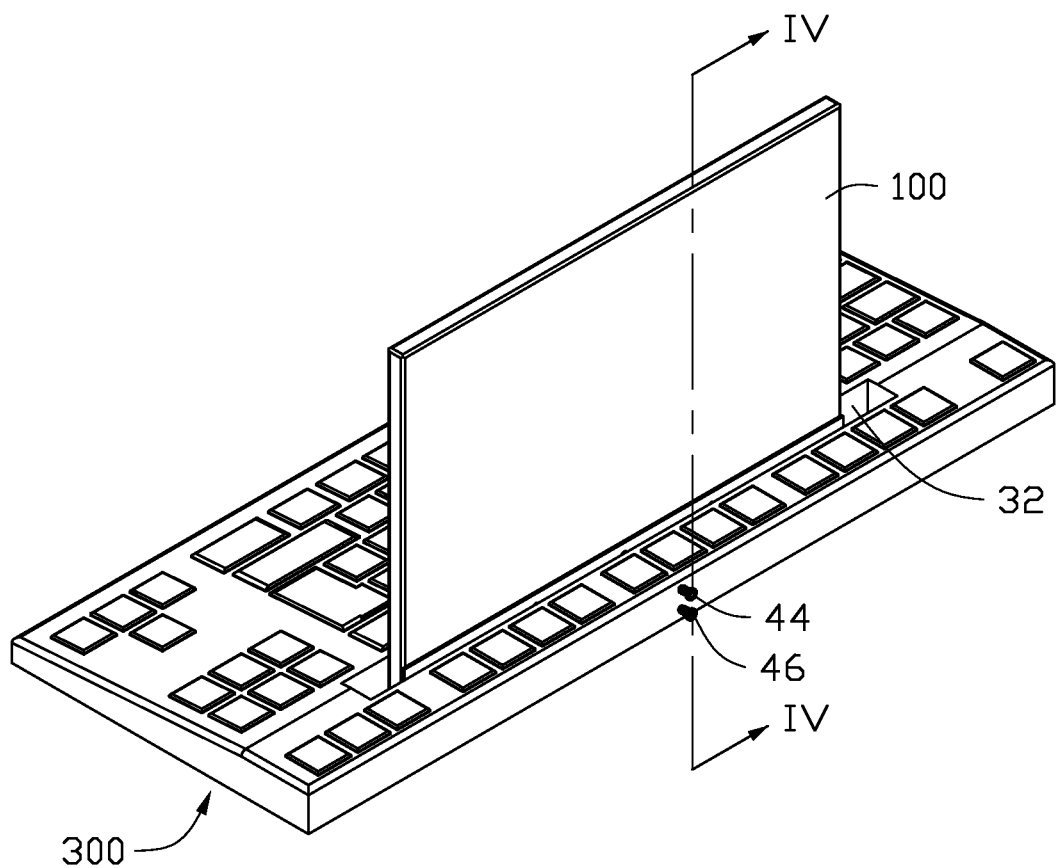
FIG. 2 is an assembled, isometric view of the keyboard of FIG. 1.
Figure 3:
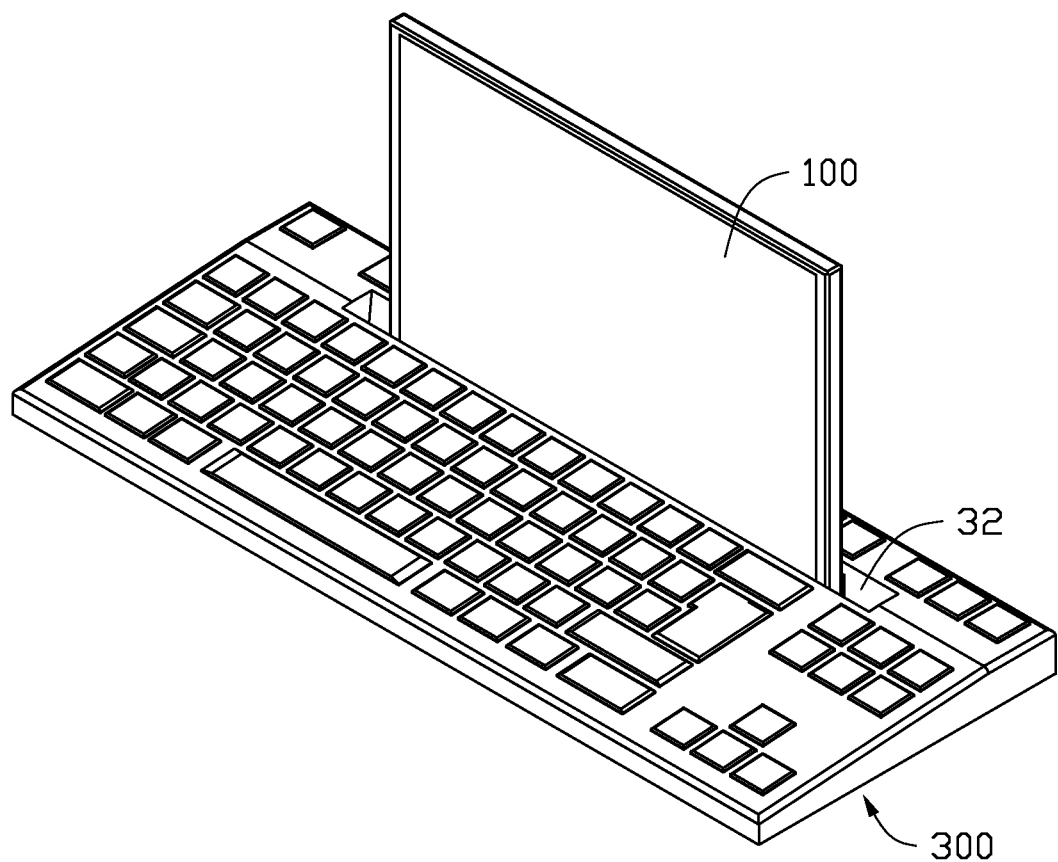
FIG. 3 is similar to FIG. 2, but viewed from a different angle.

FIGS. 2 and 3 illustrate that in assembly, the stopping plate 42 is received in the receiving portion 32. The first adjusting pole 44 extends out of the first adjusting hole 34 to abut against the plate body 422. The second adjusting pole 46 extends out of the second adjusting hole 36 to abut against the plate body 422. The first adjusting pole 44 and the second adjusting pole 46 are substantially parallel to each other and are substantially perpendicular to the plate body 422. The elastic members 424, the first adjusting pole 44, and the second adjusting pole 46 are located on the same side of the plate body 422. The elastic members 424 are substantially parallel to the first adjusting pole 44 and the second adjusting pole 46. One end of the electronic member 100 is received in the receiving portion 32 and abuts on the plate body 422. The inner screw thread of the first adjusting hole 34 is matched to and receives the outer screw thread 48 of the first adjusting pole 44. The inner screw thread of the second adjusting hole 36 is matched to and receives the outer screw thread 48 of the second adjusting pole 46. A first angle is defined between the first adjusting pole 44 and the electronic device 100. A second angle is defined between the second adjusting pole 46 and the electronic device 100. The first angle is equal to the second angle.

Figure 4:
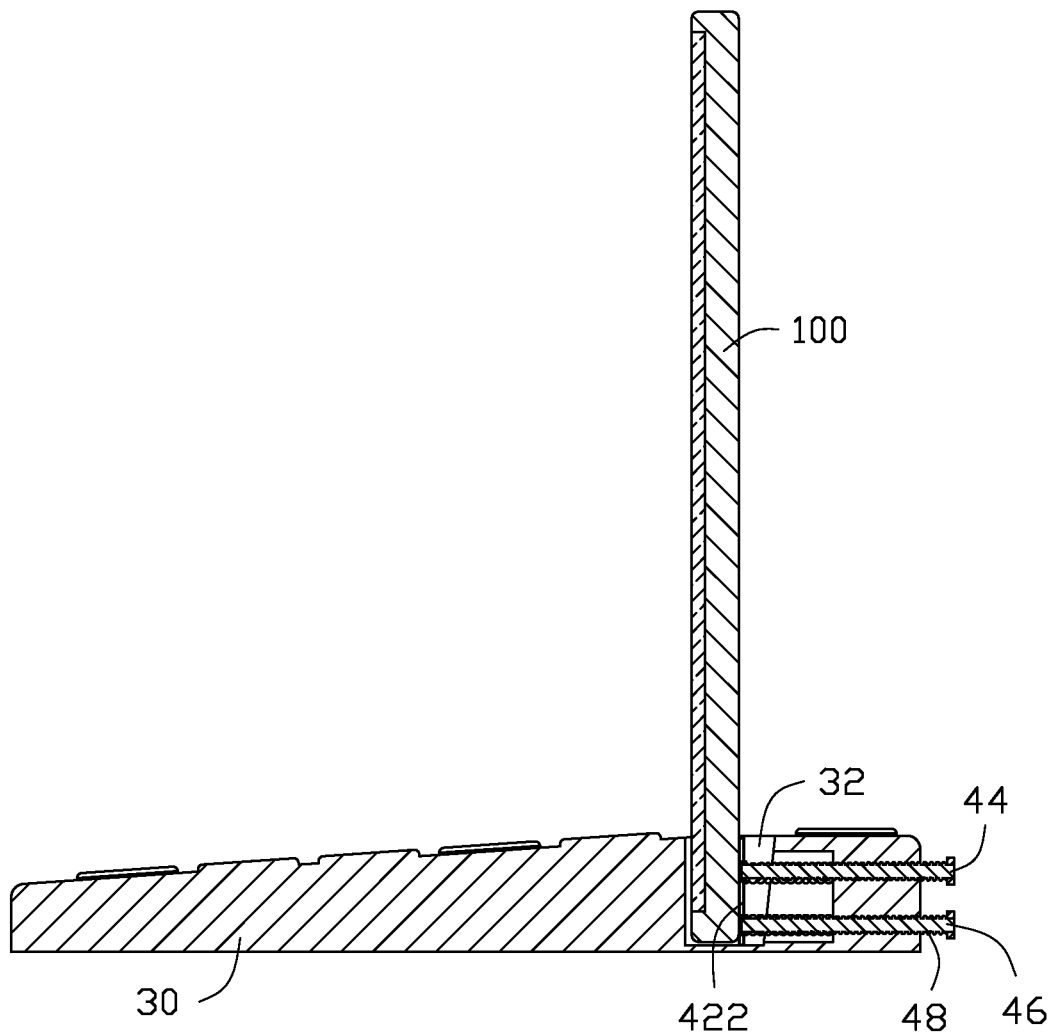
FIG. 4 is a cutaway, cross sectional view along a line IV-IV of FIG. 2, and the electronic member is in a first position.
Figure 5:
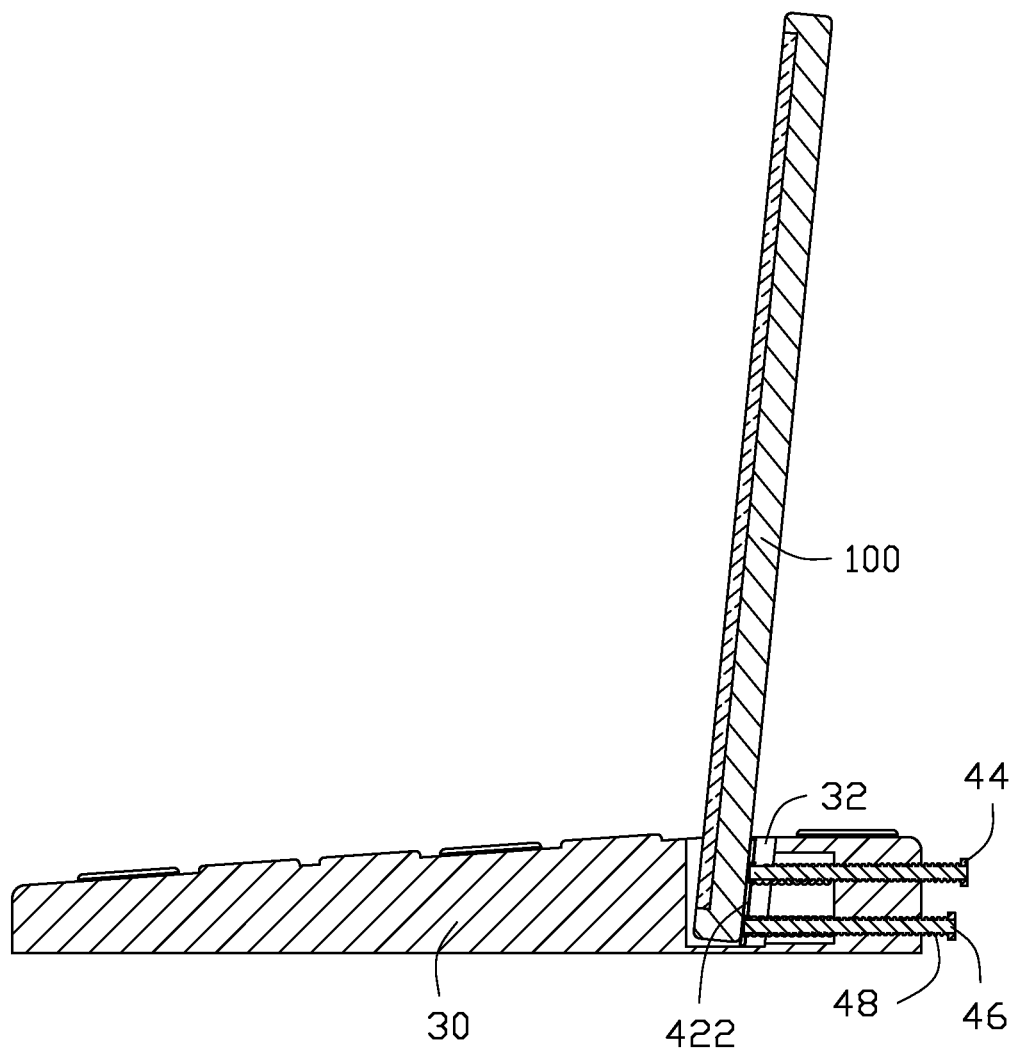
FIG. 5 is similar to FIG. 4, but the electronic member is in a second position.

FIGS. 4 and 5 illustrate that, in use, the first adjusting pole 44 and the second adjusting pole 46 can be mounted to different positions to abut against the plate body 422, thereby the plate body 422 can abut against the electronic device 100, thus the electronic device 100 can be rotated to a plurality of positions, and the first angle and the second angle can be changed. The first angle and the second angle can be acute, a right angle, or obtuse.

It is to be understood that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A keyboard for supporting an electronic device comprising:
 a keyboard body having:
  a receiving portion configured to receive an electronic device,
  a first adjusting hole coupled to the receiving portion, and
  a second adjusting hole coupled to the receiving portion, and
 an adjusting device comprising:
  a stopping plate configured to be received in the receiving portion,
  a first adjusting pole extending out of the first adjusting hole to abut against the stopping plate, and
  a second adjusting pole extending out of the second adjusting hole to abut against the stopping plate;
 wherein a first angle is defined between the first adjusting pole and the electronic device and the first angle is adjustable based on the stopping plate abutting against the electronic device when the first adjusting pole and the second adjusting pole are mounted to a plurality of positions.

2. The keyboard of claim 1, wherein the first adjusting hole defines an inner screw thread, the first adjusting pole defines an outer screw thread.

3. The keyboard of claim 1, wherein a second angle is defined between the second adjusting pole and the electronic device and the second angle is adjustable based on the first adjusting pole and the second adjusting pole being mounted to a plurality of positions.

4. The keyboard of claim 3, wherein the first angle is equal to the second angle.

5. The keyboard of claim 1, wherein the second adjusting hole defines an inner screw thread, the second adjusting pole defines an outer screw thread.

6. The keyboard of claim 1, wherein the stopping plate comprises a plate body and an elastic member, one end of the elastic member is secured to the plate body, and the other end of the elastic member abuts against the keyboard body.

7. The keyboard of claim 6, wherein the elastic member is substantially perpendicular to the plate body.

8. The keyboard of claim 6, wherein the elastic member is substantially parallel to the first adjusting pole.

9. The keyboard of claim 6, wherein the elastic member, the first adjusting pole, and the second adjusting pole are located on the same side of the plate body.

10. The keyboard of claim 1, wherein the first angle is substantially acute.

11. A keyboard for supporting an electronic device comprising:
 a keyboard body having:
  a receiving portion configured receive an end of an electronic device,
  a first adjusting hole coupled to the receiving portion, and
 an adjusting device comprising:
  a stopping plate configured to be received in the receiving portion, and
  a first adjusting pole received in the first adjusting hole and abutting against the stopping plate;
 wherein the first adjusting pole can be mounted to a plurality of positions to abut against the stopping plate, thereby the stopping plate can abut against the electronic device, thus the electronic device can rotate to a plurality of positions.

12. The keyboard of claim 11, wherein the keyboard body further defines a second adjusting hole, the adjusting device further comprises a second adjusting pole received in the second adjusting hole and abutting against the stopping plate, the first adjusting pole and the second adjusting pole can be mounted to a plurality of positions to abut against the stopping plate, thereby the stopping plate can abut against the electronic device, thus the electronic device can rotate to a plurality of positions.

13. The keyboard of claim 12, wherein the second adjusting hole defines an inner screw thread, the second adjusting pole defines an outer screw thread.

14. The keyboard of claim 12, wherein the first adjusting pole and the second adjusting pole are substantially parallel to each other.

15. The keyboard of claim 12, wherein a second angle is defined between the second adjusting pole and the electronic device and the second angle is adjustable based on the second adjusting pole being mounted to a plurality of positions.

16. The keyboard of claim 15, wherein a second angle is defined between the first adjusting pole and the electronic device, the first adjusting pole and the second adjusting pole can be mounted to a plurality of positions to change the first angle and the second angle, and the first angle is equal to the second angle.

17. The keyboard of claim 16, wherein the second angle is substantially acute.

18. The keyboard of claim 15, wherein the first angle can be obtuse or rectangular.

19. The keyboard of claim 11, wherein the stopping plate comprises a plate body and an elastic member, one end of the elastic member is secured to the plate body, and the other end of the elastic member abuts against the keyboard body.

20. The keyboard of claim 19, wherein the elastic member is substantially parallel to the first adjusting pole.

* * * * *